A. B. CRAIG.
COOLING DEVICE FOR PNEUMATIC TIRES.
APPLICATION FILED SEPT. 7, 1911.
1,049,677.
Patented Jan. 7, 1913.
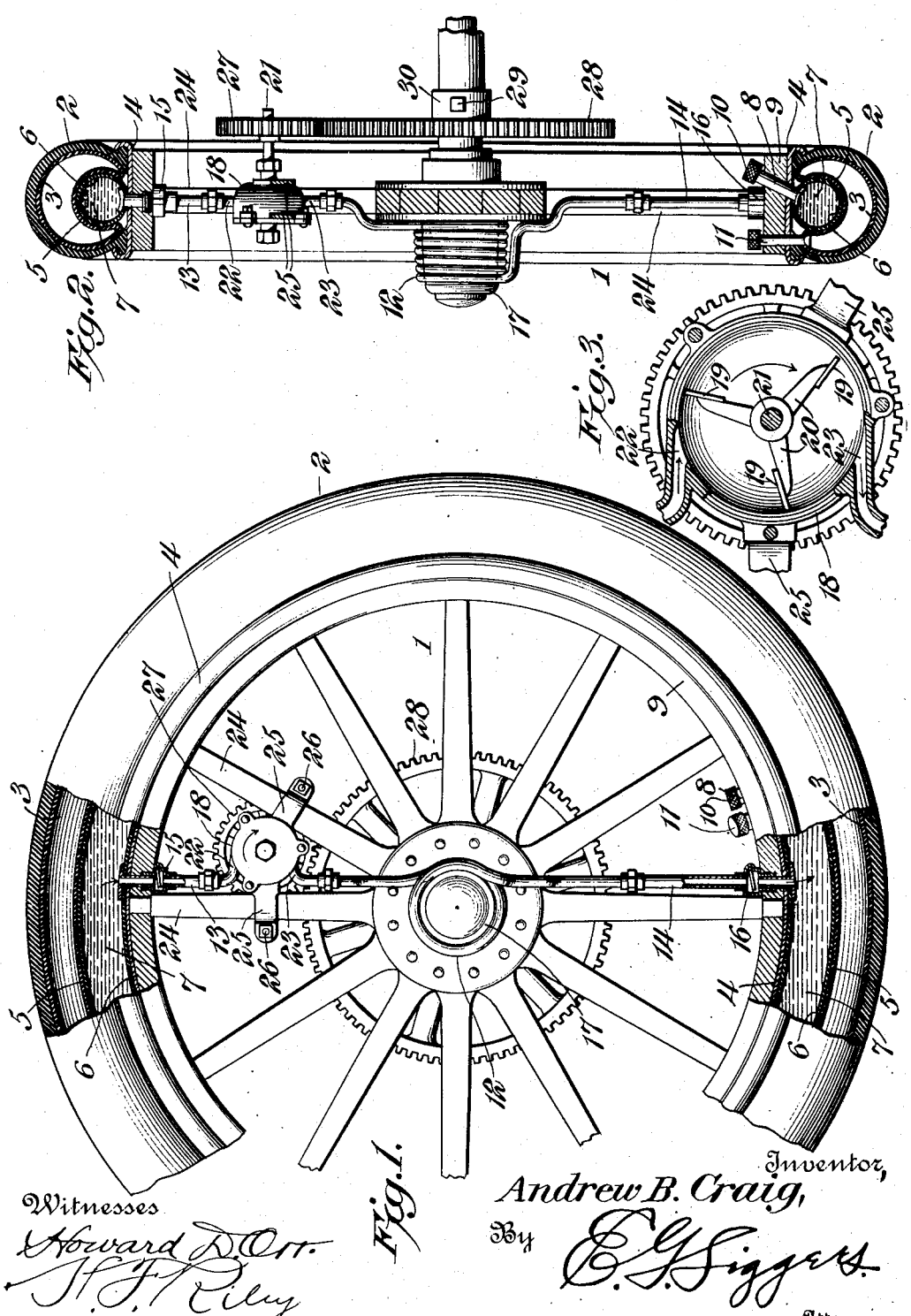
Witnesses
Howard D. Orr
N. F. Riley
Inventor,
Andrew B. Craig,
By E. G. Siggers
Attorney

UNITED STATES PATENT OFFICE.

ANDREW B. CRAIG, OF TARKIO, MISSOURI.

COOLING DEVICE FOR PNEUMATIC TIRES.

1,049,677. Specification of Letters Patent. Patented Jan. 7, 1913.

Application filed September 7, 1911. Serial No. 648,233.

*To all whom it may concern:*

Be it known that I, ANDREW B. CRAIG, a citizen of the United States, residing at Tarkio, in the county of Atchison and State of Missouri, have invented a new and useful Cooling Device for Pneumatic Tires, of which the following is a specification.

The invention relates to a cooling device for pneumatic tires.

The object of the present invention is to improve the construction of cooling devices for pneumatic tires, and to provide a simple, efficient and comparatively inexpensive construction, designed for cooling the pneumatic tires of various kinds of wheels, and capable of maintaining a sufficiently low temperature within a pneumatic tire to prevent the air contained therein from expanding and blowing out, or otherwise injuring the tire.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation, partly in section, of a wheel having a pneumatic tire and equipped with a cooling device, constructed in accordance with this invention. Fig. 2 is a transverse sectional view. Fig. 3 is a detail sectional view, illustrating the construction of the rotary pump.

Like numerals of reference designate corresponding parts in all the figures of the drawing.

In the accompanying drawing in which is illustrated the preferred embodiment of the invention, 1 designates a wheel having a pneumatic tire 2, consisting of an outer tube or shoe and an inner tube 3, provided at the rim 4 with a circumferential fold or tubular portion 5 for the reception of a circumferential cooling tube 6 which is of less diameter than the pneumatic tire. The outer tube or shoe of the pneumatic tire is of the clencher type and engages side flanges of the rim, but the pneumatic tire may be mounted on a wheel in any other preferred manner. The tubular circumferential portion 5 of the inner tube fits around the cooling tube, which is adapted to contain a suitable liquid 7 for maintaining the temperature of the air within the pneumatic tire sufficiently low to prevent the tire from heating and bursting.

The circumferential cooling device may be constructed of rubber, metal, or other suitable material, and it is designed to enable a sufficient quantity of liquid to circulate within the pneumatic tire to maintain a relatively low temperature within the same. The liquid may consist of salt water, or any other suitable material, salt water being preferred especially in the warmer seasons of the year, as it is a preservative of rubber, but alcohol or some other liquid, which will not freeze in winter under ordinary conditions may be used during the cold months of the year. The liquid is introduced into and removed from the cooling tube by means of a short tube 8, piercing the felly 9 and the rim 4 of the wheel and equipped with a suitable closure 10. The wheel is also equipped with a valve 11 for inflating the inner tube.

The cooling tube is connected at diametrically opposite points with a radiator 12 by means of branch tubes 13 and 14, preferably equipped with check valves 15 and 16 to prevent back pressure or a rearward flow of the liquid. The branch tubes 13 and 14 pierce the rim and the felly and are suitably connected with the cooling tube. The radiator 12 is preferably in the form of a coil, arranged on the outer portion of the hub 17 of the wheel, but any other form of radiator may, of course, be employed. The liquid is caused to circulate through the radiator and the branch tubes 13 and 14 by means of a rotary pump and as the radiator is exposed to the air, the liquid circulating through it will be maintained at a sufficiently low temperature to prevent heating of the tire.

The rotary pump comprises a casing 18 and a plurality of blades 19, mounted on radial arms 20 of a shaft 21, which is journaled in suitable bearings of the sides of the casing. The casing is provided at diametrically opposite points with inlet and outlet ports 22 and 23 with which the adjacent portion of the branch tube 13 is connected. The pump, which is located between two of the spokes 24 of the wheel, is secured to the same by clips or clamps 25, composed of arms arranged in pairs and located at opposite sides of the adjacent spokes. The arms of the clips 25 extend outwardly from the casing, and the members of each pair are connected at their outer ends by bolts 26, which cause the arms or sides of the clip to firmly engage or embrace the spokes.

The shaft of the rotary pump carries a pinion 27, which meshes with a fixed gear 28, secured to the axle by means of a set screw 29, or other suitable means, and adapted through the rotary movement of the wheel to rotate the pinion 27 and actuate the shaft of the rotary pump. The set screw 29 pierces an extended hub portion 30 of the gear wheel, as clearly illustrated in Fig. 2 of the drawing. Any other form of gearing or motion transmitting means, such as a belt and pulley, may be employed and any other preferred form of pump may be utilized for producing a circulation of liquid through the radiator and the branch tubes. When the wheel rotates and the pump operates, the liquid is drawn from the cooling tube of the wheel at one point on the rim, and it is caused to flow through the radiator and the connecting tubes and to reënter the cooling tube at a diametrically opposite point on the rim. By this construction, the tire may be maintained sufficiently cool to prevent injury to it.

The radiator or cooling coil may be located at any other desired point, and means other than the exposure of the radiator to the atmosphere may be employed for cooling the liquid as it flows through the radiator.

Instead of mounting the pump between the spokes in the manner shown, it may be arranged at any other convenient point.

No claim is made in the present application to the following subject-matter, which is claimed in a copending application filed by me Aug. 13, 1912, Serial No. 714,934: The combination with a wheel having a pneumatic tire, of a cooling device therefor including a circumferential cooling tube of less diameter than and located within the pneumatic tire, a pump mounted on the wheel and connected with the interior of the cooling tube for producing a circulation of a cooling medium through the interior of the cooling tube, said tube containing within it that portion of the cooling medium circulating through the tire, and means for operating the pump.

Having thus fully described my invention, what I claim as new and desire to secure by Letters Patent, is:—

1. The combination with a wheel having a pneumatic tire, of a circumferential cooling tube located within the tire, a radiator coil mounted on the wheel and connected with the cooling tube, a rotary pump mounted on the wheel and communicating with the radiator coil for producing a circulation of a cooling medium through the radiator coil and the tire, and means for rotating the said pump.

2. The combination with a wheel having a pneumatic tire provided with means for receiving a cooling medium, of a radiator coil arranged on and fitting the hub of the wheel and connected with the tire, a pump mounted on and carried by the wheel and communicating with the radiator coil for producing a circulation of a cooling medium through the same and through the tire, and means for operating the pump.

3. The combination with a wheel having a pneumatic tire provided with means for receiving a cooling medium, of a radiator coil arranged on and fitting the hub at one side of the wheel and carried by the latter and communicating with the tire, a pump mounted on and carried by the wheel and communicating with the radiator coil for producing a circulation of a cooling medium through the same and through the tire, and gearing located at the side of the wheel opposite that at which the radiator coil is arranged and including a fixed gear connected with the axle of the wheel, and a rotary gear connected with the pump and meshing with and revoluble around the fixed gear.

4. The combination with a wheel having a pneumatic tire, of a cooling tube located within the pneumatic tire, a radiator coil arranged on and fitting the hub of the wheel, branch tubes connecting the radiator coil with the cooling tube, a pump mounted on and carried by the wheel and connected with one of the branch tubes and arranged between two of the spokes of the wheel and provided with clips for engaging the said spokes, and means connected with the pump for operating the same.

5. The combination with a wheel having a rim, of a circumferential cooling tube mounted on the rim, a tire including an inner tube having a circumferential fold fitted around the sides and the outer portion of the cooling tube and terminating at opposite sides thereof adjacent to the rim, and an outer tube or shoe covering the inner tube and detachably connected with the rim, the inner and outer tubes of the tire being detachable from the rim without removing the cooling tube therefrom, and means arranged exteriorly of the tire for causing a circulation of a cooling medium through the cooling tube.

In testimony, that I claim the foregoing as my own, I have hereto affixed my signature in the presence of two witnesses.

ANDREW B. CRAIG.

Witnesses:
JOHN H. SIGGERS,
FRANCES PEYTON SMITH.